(12) United States Patent
Kralles et al.

(10) Patent No.: US 7,478,895 B2
(45) Date of Patent: Jan. 20, 2009

(54) BACKPRINTING ASSEMBLY FOR A PHOTOGRAPHIC PRINTER

(75) Inventors: Christopher J. Kralles, Rochester, NY (US); Edward R. Schranz, Rochester, NY (US); Carl J. Rosati, Rochester, NY (US); Bradley C. DeCook, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 773 days.

(21) Appl. No.: 10/728,628

(22) Filed: Dec. 5, 2003

(65) Prior Publication Data
US 2005/0134633 A1 Jun. 23, 2005

(51) Int. Cl.
*B41J 2/015* (2006.01)

(52) U.S. Cl. .............................. 347/20; 347/84; 347/85

(58) Field of Classification Search ............. 347/22–36, 347/84, 85, 86, 20, 68, 61
See application file for complete search history.

(56) References Cited

U.S. PATENT DOCUMENTS

| | | | |
|---|---|---|---|
| 5,764,263 A * | 6/1998 | Lin | 347/101 |
| 5,914,734 A | 6/1999 | Rotering et al. | |
| 6,181,409 B1 | 1/2001 | Calhun | |
| 6,227,731 B1 | 5/2001 | Kralles et al. | |
| 6,435,743 B2 | 8/2002 | Kralles et al. | |
| 6,491,368 B1 * | 12/2002 | Cipolla et al. | 347/23 |
| 6,585,347 B1 | 7/2003 | Johnson et al. | |
| 6,646,754 B1 | 11/2003 | Redd et al. | |
| 2004/0189742 A1 * | 9/2004 | Kimura et al. | 347/33 |

FOREIGN PATENT DOCUMENTS

| | | |
|---|---|---|
| EP | 0 546 376 | 7/1991 |
| EP | 0435276 A1 * | 7/1991 |
| JP | 09001827 A * | 1/1997 |

* cited by examiner

*Primary Examiner*—Manish S Shah
(74) *Attorney, Agent, or Firm*—David A. Novais; Kathleen Neuner Manne

(57) ABSTRACT

The present invention provides for a printing apparatus that includes an automatic backprinting assembly. The automatic backprinting assembly includes a movable ink jet printhead that is movable between at least a printing position to print on the backside of photographic media and a priming position where the printhead is pressurized to force a stream of ink through discharge jets of the printhead.

24 Claims, 7 Drawing Sheets

BACKPRINTING ASSEMBLY FOR A PHOTOGRAPHIC PRINTER

FIELD OF THE INVENTION

The present invention relates to an automatic backprinting assembly for a printing apparatus such as a photographic printer, wherein the backprinting assembly includes an ink jet printing system which is adapted to automatically move between a printing position and a priming position.

BACKGROUND OF THE INVENTION

Photographic printers that include backprinting systems generally incorporate a drop-on-demand ink jet-type backprinting assembly that writes alphanumeric information on the backside of photographic media. While this system is inexpensive relative to a recirculating continuous ink jet system, it is best suited for continuous operations, rather than an intermittent operation of a photographic printer, to prevent the small diameter ink delivery jets of the printhead from clogging with dried ink. A drawback with a drop-on-demand ink jet backprinting system in a photographic printing environment is that the ink jet will generally clog with ink and thus, has to be manually removed from the printer to prime or clean the ink jet printhead. Further, in the environment of a photographic printer, the printer may start and/or stop at several intervals throughout the day which may lead to the clogging of the ink jet printhead during a down time of the printer. This also requires the manual cleaning of the ink jet printhead before a start up operation of the printer. A manual and/or frequent cleaning as discussed above, adds cost to the operation of the photographic printer and affects the efficiency of the printer.

Further, the manual cleaning of the ink jet printhead by actually removing the ink jet printhead from the printer also increases the likelihood of the ink spilling throughout interior of the photographic printer which thus necessitates the cleaning of the interior of the printer.

SUMMARY OF THE INVENTION

The present invention provides for an automatic backprinting assembly which is adapted to automatically write information such as alphanumeric information on the back side of the photographic printer; and further, is adapted to automatically move from a printing position to a priming position so as to force a stream of ink through discharge jets of the printhead and thus, clean out the jets of the printhead.

The backprinting assembly of the present invention is preferably a drop on demand ink jet backprinting system where the ink formulation is designed to quickly dry, so that the ink will not transfer to the emulsion side of the paper when rolled up in a take-up cassette or transfer to paper drive rollers and tracking surfaces. The geometry and orientation of the ink jet printhead of the present invention allows the ink to drip and collect at the bottom edge or chin of the printhead, to facilitate the cleaning of the discharge head when it moves from a printing position to a priming position and thereafter, back to the printing position. In a drop-on demand arrangement, the amount of ink per character and the pressure at which it is delivered may be insufficient to maintain a reliable delivery system in the particular work environment of a photographic printer. The present invention overcomes the drawbacks associated with inactivity and dripping ink by automatically priming the printhead at predetermined intervals, for example, two hour intervals, in a remote location, then subsequently wiping the face of the jets of the printhead to remove excess ink.

Thus, the present invention provides for a backprinting assembly that automatically primes at a user settable interval. The backprinting assembly of the present invention includes an ink jet printhead that is adapted to move, pivot or rotate from a printing position to a priming and purging position, and then back to the printing position. The location of the mechanism to move, rotate or pivot the ink jet printhead is adapted to rotate the printhead in a manner in which the discharge surface of the printhead translates away from the paper as soon as the motion of the printhead begins. This prevents any residual ink from being transferred to the web of photographic media.

In the priming position, the automatic backprinting assembly of the present invention is adapted to automatically pressurize the ink jet printhead to a prime pressure (for example, 5-20 psi). This forces a stream of ink through the jets, freeing the jets of clogged debris and dried ink.

The present invention further provides for an enclosure such as an ink collection spittoon that faces the discharge jets of the ink jet printhead in the priming and purging position. The enclosure is designed to catch the stream of ink as it is forced through the jets of the ink jet printhead.

The present invention accordingly provides for a printing apparatus that comprises a printing section adapted to print images on photographic media; and an automatic backprinting assembly adapted to print information on a backside of the photographic media. The automatic backprinting assembly comprises a movable ink jet printhead that is movable between at least a printing position to print on the back side of the photographic media, and a priming position where the printhead is pressurized to force a stream of ink through the discharge jets of the printhead.

The present invention further provides for a backprinting assembly adapted to print information on the backside of photographic media which comprises a movable ink jet printhead that is movable between at least a printing position to print on the back side of the photographic media, and a priming position where the printhead is pressurized to force a stream of ink through discharge jets of the printhead.

The present invention further relates to a method of providing information on the backside of photographic media during a photographic printing process which comprises the steps of inserting photographic media into a photographic printer; printing an image onto a front side of the photographic media; backprinting information onto a backside of the media by positioning a printhead in a printing position and directing ink from the printhead onto the backside of the media; moving the printhead from the printing position after a predetermined period of time to a priming position where discharge jets of the printhead face an enclosure; pressurizing the printhead while in the priming position to force a stream of ink through the discharge jets of the printhead and into the enclosure; and moving the printhead to back to the printing position.

DETAILED DESCRIPTION OF THE INVENTION

Figure 1:
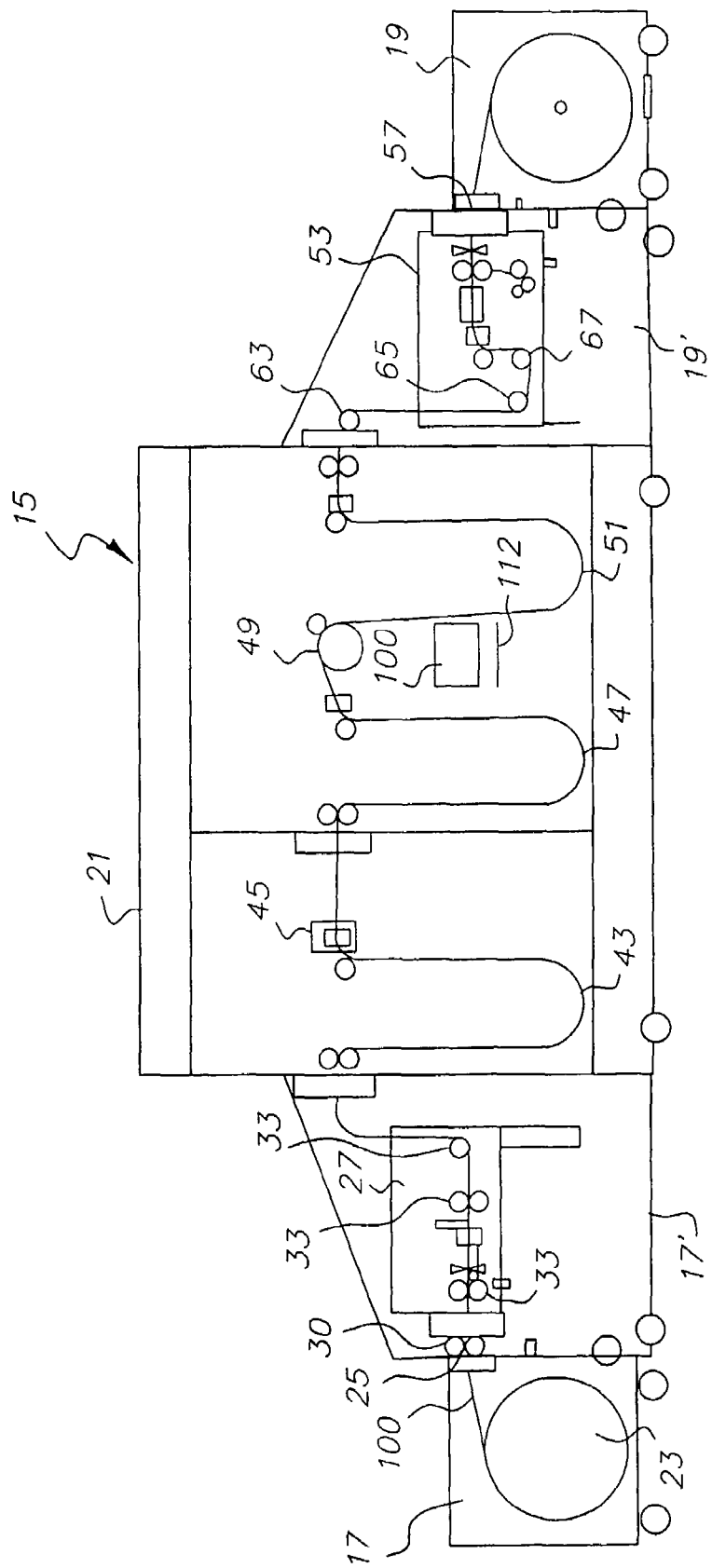
FIG. 1 is a side view of a printing apparatus which can be utilized in the present invention.

Referring now to the drawings, wherein like reference numerals designated identical or corresponding parts throughout the several views, FIG. 1 is a side view of a printing apparatus 15 which can be utilized in the present invention. It is noted that printing apparatus 15 is shown as an example and that the present invention is not limited to such a printing apparatus. It is further noted that the backprinting assembly of the present invention is applicable to other types of photographic printers, wherein the backprinting of information on a backside of photographic media is desired.

In the example of FIG. 1, printing apparatus 15 can include one or more supply cassettes 17 that includes a supply roll 23 of media such as, for example, photographic or photosensitive media. A supply section 17' of the printing apparatus can include an entry opening or port 25 which meets with a corresponding opening or port in cassette 17 to permit a web 100 of photosensitive material to enter into a supply section 17' of printing apparatus 15. Provided within supply section 17' is a transport assembly 27 which can be located so as to mate with entry port 25. A pair of drive rollers 30 convey the web of photosensitive material into transport assembly 27 where a further arrangement of drive rollers 33 transport the web of photosensitive material through transport assembly 27. The media is then transferred to a printing section 21 which can be, for example, a laser printer. After the photosensitive web enters printing section 21, the material can sequentially pass through a first slack loop 43, through a paper punching/marking section 45, through a second slack loop 47, over a print drum 49 where the material can be laser scanned in accordance with imaging information (attained separately by scanning a processed film strip), through a third slack loop 51, and into a take-up section 19'. Like supply section 17', take-up section 19' includes a take-up assembly 53 which is adapted to mate with a corresponding media exit opening or port 57 provided on take-up section 19'. At least one take-up cassette 19 can be provided at opening 57 so that the web of photosensitive material is supplied directly to take-up cassette 19. It is noted that a series of rollers 63, 65, 67 and 80 can be used to transport the web of photosensitive material to take-up cassette 19. The particulars of the printing apparatus is as shown in FIG. 1 are described in commonly assigned U.S. Pat. Nos. 6,435,743 and 6,227,731, the contents of which are herein incorporated by reference.

In a feature of the present invention, a backprinting assembly 100 schematically shown in FIG. 1 can be positioned within printing section 21 and preferably downstream of print drum 49 with respect to a direction of travel of the media. Backprinting assembly 100 is provided on a removable tray 112 and is adapted to provide information onto a backside of photographic media 100; specifically alphanumeric information, such as the processing date for the photographic media, the batch ID for the photographic media, the lab ID, etc. Backprinting assembly 100 provided on tray 112 can be slidably, pivotally or rotatably moved between a position substantially outside of printing apparatus 15 for operations such as maintenance etc.; and an operating position within printer 15, where the ink jet printhead of the backprinting assembly: (1) is operative to print information on the backside of photographic web 100; or (2) can be moved to a priming and purging position so as to discharge ink from the jets of the printhead and clean any excess ink.

Figure 2:
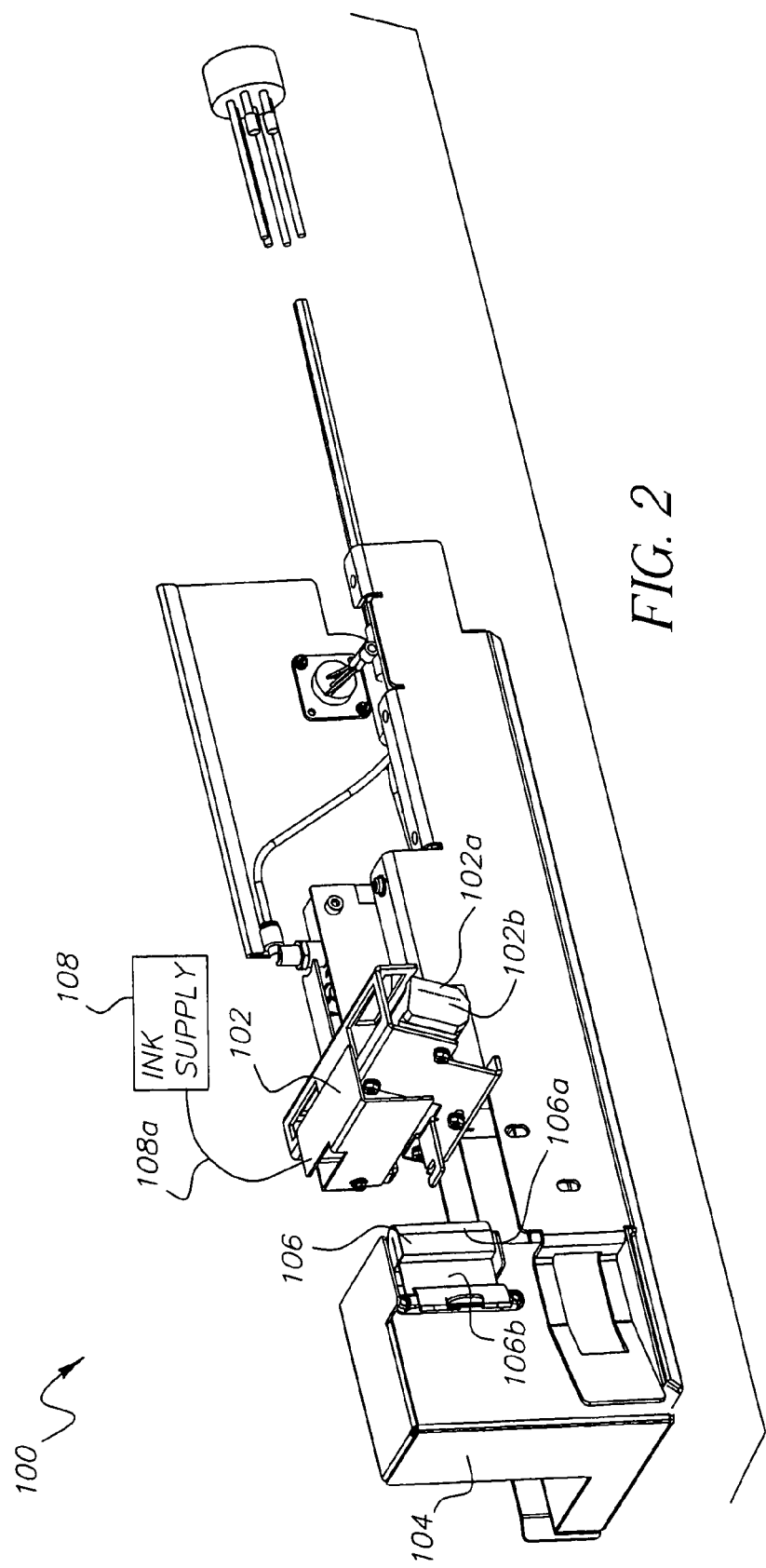
FIG. 2 is an isolated view of the backprinting assembly utilized in the printing apparatus of FIG. 1, wherein the ink jet printhead is in a printing position.

FIG. 2 is a schematic isolated view of backprinting assembly 100. As shown in FIG. 2, backprinting assembly 100 comprises a printhead 102 having a front end 102a which includes discharge jets 102b. In the illustration of FIG. 2, ink jet printhead 102 is in a printing position such that front end 102a would face a backside of the media which is not shown in order to more clearly illustrate the printhead. That is, in the position of FIG. 2, ink jet printhead 102 faces the backside of photographic media 100 such that discharge jets 102b on front end 102a will directly oppose the backside of photographic media 100 to provide information on the backside of photographic media 100.

As further shown in FIG. 2, backprinting assembly 100 includes an enclosure 104 which basically acts as spittoon for receiving ink discharged through jets 102a at front end 102a when printhead 102 is in a priming position. Attached to enclosure 104 is a wiper pad assembly 106 which includes a wiper pad 106a that can be formed of a material which has little or no loose fibers such as a non-woven fibrous material. Wiper pad 106a is provided on an end portion of a wall of enclosure 104 so as to be in the path of front end 102a of printhead 102 as printhead 102 moves from the printing position to the priming position and back to the printing position. With this arrangement, wiper pad 106a is effective to wipe discharge jets 102b of printhead 102 when printhead 102 moves from the priming position to the printing position to remove excess ink from the printhead.

Therefore, during use of backprinting assembly 100 for printing information on a backside of photographic media, printhead 102 is positioned as noted in FIG. 2, and ink from, for example, an ink supply 108 is provided through line 108a to ink jet printhead 102. This ink is thereafter discharged through discharge jets 102b at front end 102a of printhead 102 onto the backside of photographic media 100 so as to provide information such as processing date, batch ID information, lab ID information, etc., on the backside of media 100. Ink jet supply 108 can be disposed within photographic printer 15 or can be mounted outside of photographic printer 15 for easy access. It is preferable that ink jet supply 108 be at the same level as ink jet printhead 102 to maximize the supply of ink to ink jet printhead 102.

Figure 3:
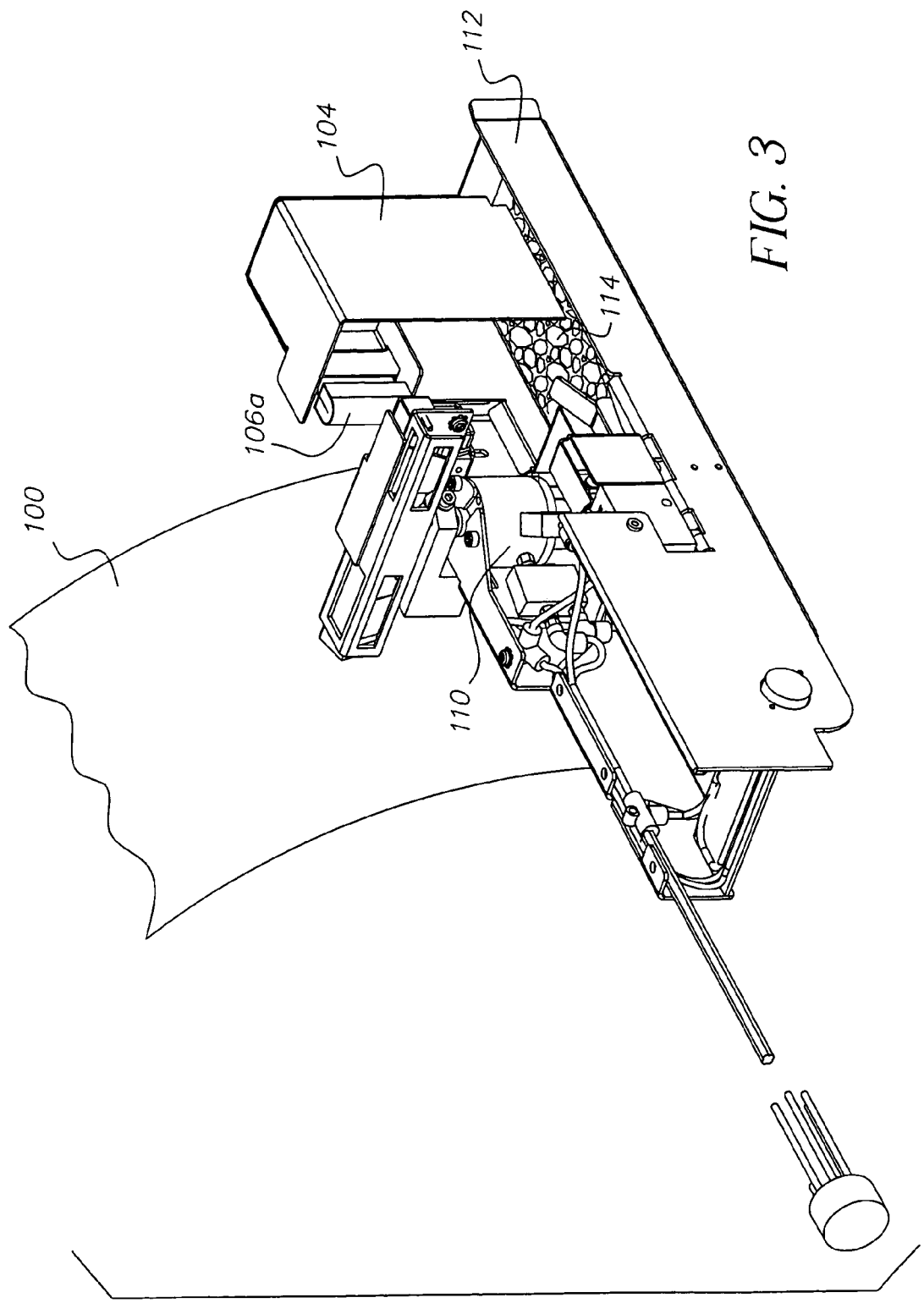
FIG. 3 is a further view of the backprinting assembly of FIG. 2 wherein the printhead is in a printing position.
Figure 5:
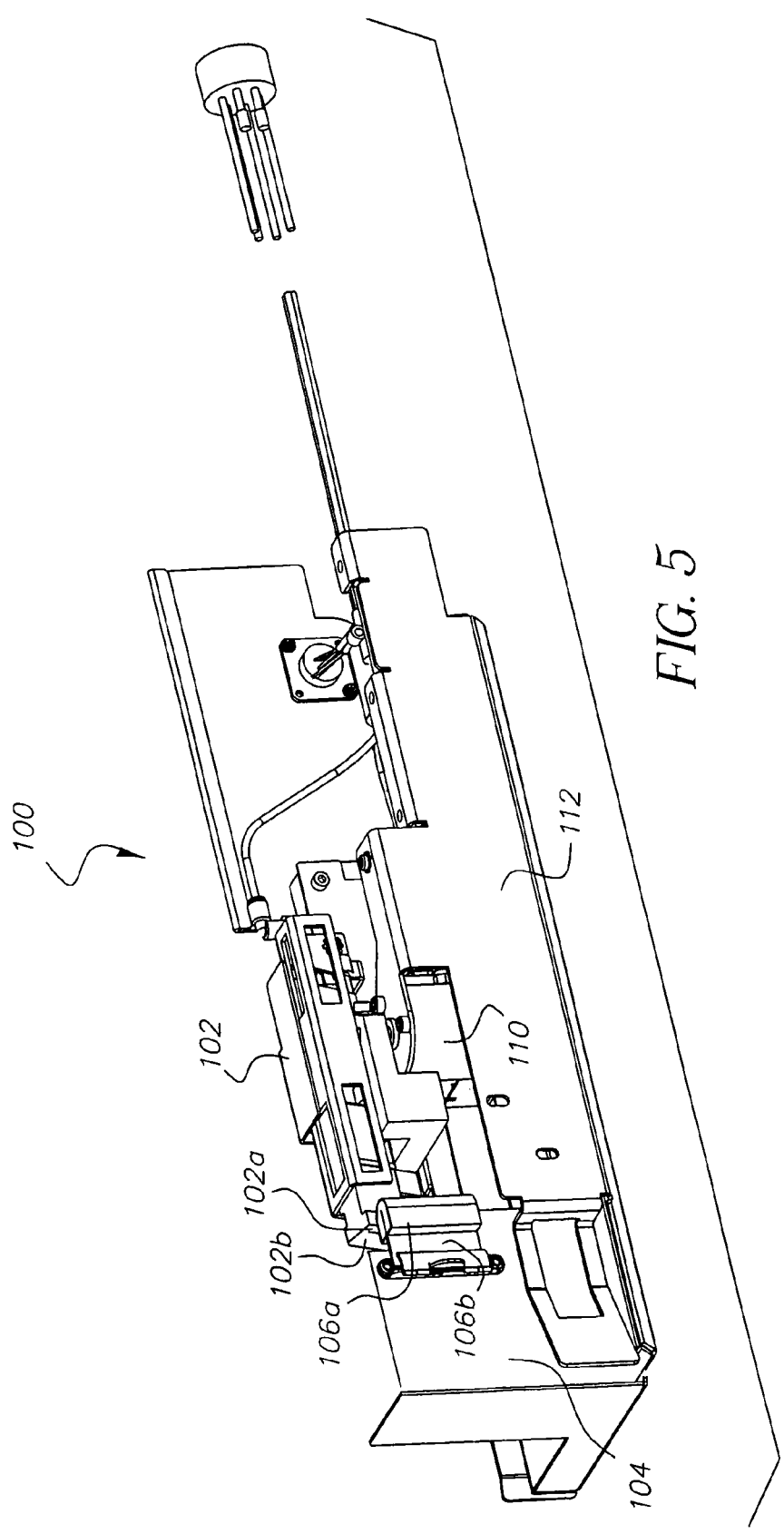
FIG. 5 is a top view of the backprinting assembly of the present invention, wherein the printhead is in a priming position.

FIG. 3 is a view of the backside of backprint assembly 100 of FIG. 2 and provides a view of enclosure 104, wiper pad 106a, and a movement device 110 utilized to move, pivot or rotate printhead 102 between the printing position illustrated in FIGS. 2 and 3, and the priming position illustrated in, for example, FIG. 5. As shown in FIG. 3, enclosure 104 defines an area which is adapted to receive discharged ink when ink jet 102 is primed or purged. As further shown in FIG. 3, backprint assembly 100 is preferably provided on ink tray 112 which, as described above, can be slidable, pivotable or rotatable into an operative position within printer 15 and removed from the operative position to a position outside of printer 115 for maintenance operations. In a feature of the present invention, an absorbent foam or felt material 114 can be provided on the surface of ink tray 112 in a manner in which the foam or felt material also extends into enclosure 104. Therefore, in a priming position, as ink is discharged through the ink jet printhead, any ink which falls onto the surface of tray 112 will be absorbed by the absorbent foam or felt material. Absorbent foam or felt material 114 is designed to be removable such that ink tray 112 can be periodically moved to an inoperative position and the absorbent foam or felt material 114 can be replaced with new absorbent foam or felt material.

As further shown in FIG. 3, ink jet printhead 102 is preferably moved, pivoted or rotated by movement device 110 which can be, for example, a rotary solenoid. Therefore, during use of backprinting assembly 100 of the present invention, with backprinting assembly 100 in an operative position within printer 15 as shown in FIG. 1, movement device 110 is actuated to position printhead 102 in the location illustrated in FIG. 3 to write information on the backside of web or media 100; and when it is desired to prime or purge printhead 102, movement device 110 is actuated to move, rotate or pivot printhead 102 to the priming position illustrated in FIG. 5.

Figure 4:
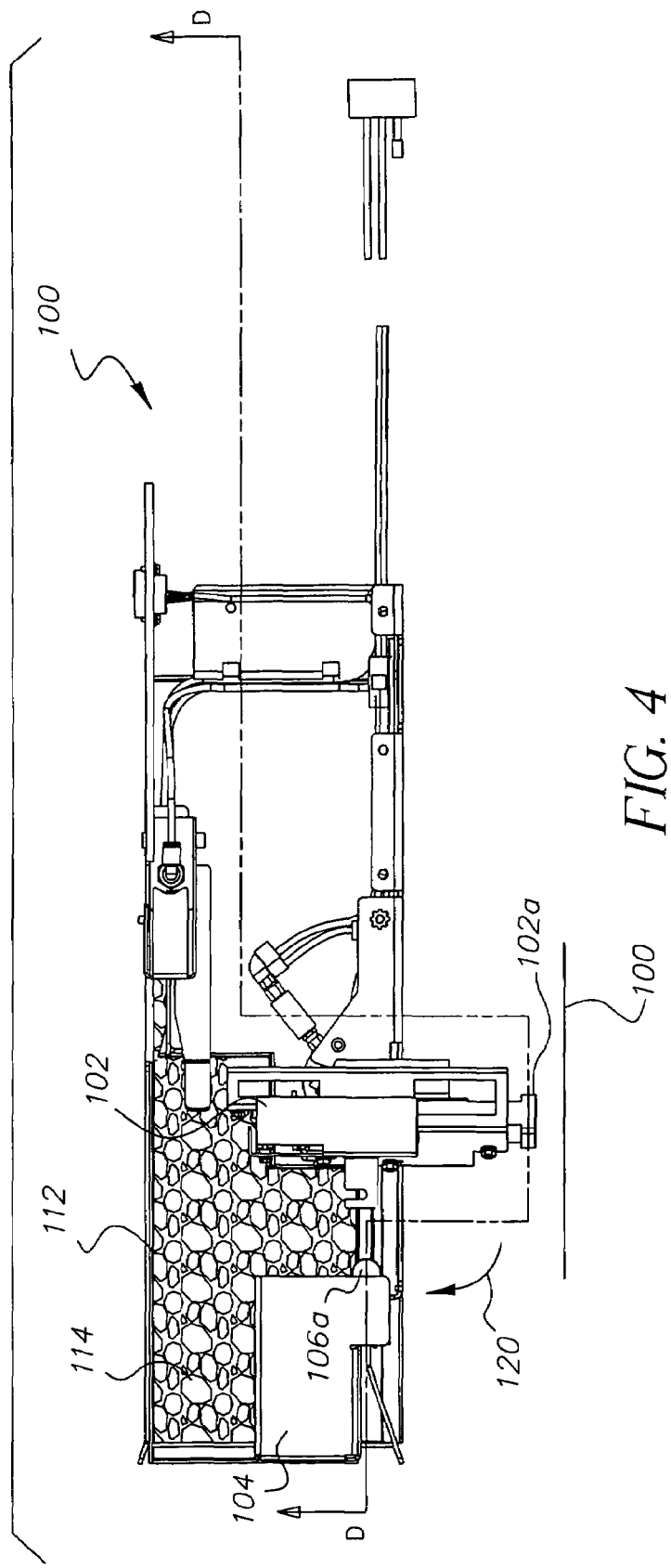
FIG. 4 is a top view of the backprinting assembly of the present invention wherein the printhead is in a printing position.

FIG. 4 is a top view of backprinting assembly 100 with printhead 102 in a printing position for printing on media or web 100. In a feature of the present invention, movement device 110 has a center of rotation which permits printhead 102 to be translated away from media 100 as soon as the rotary or pivotable motion of printhead 102 from the printing position to the priming position begins. This prevents any chance of streaking ink along media 100 from any excess ink. Further, the movement of printhead 102 in a direction generally indicated by arrow 120 causes discharge jets 102b of printhead 102 to abut against wiper pad 106a as front end 102a passes by wiper pad 106a.

With reference to FIG. 5, once printhead 102 is in the priming position, discharge jets 102b of printhead 102 face towards an interior of enclosure 104. In this position, printhead 102 is pressurized to a prime pressure sufficient to force a stream of ink through the discharge jets. This frees the discharge jets of clogged debris and dried ink. The prime pressure is approximately 5-20 psi, however, this is adjustable based on the amount of ink or debris that is clogging the discharge jets, the size of the printhead, etc. The stream of ink settles within enclosure 104 and falls onto the surface of ink tray 112. This excess ink is thereafter, absorbed by absorbent foam or felt material 114 provided on the surface of ink tray 112. After the priming or purging is complete, the ink jet printhead is moved, pivoted or rotated back to the printing position as shown in FIG. 4. While it is being moved, pivoted or rotated back to the printing position, front end 102a of printhead 102 will abut against wiper pad 106a so as to wipe and absorb any excess ink from discharge jets 102b of printhead 102. It is noted that wiper assembly 106 can be attached to the wall of enclosure 104 by utilizing a simple spring clip 106b as shown in FIG. 5. The location of wiper pad 106a interferes with the pivotal or rotary motion of printhead 102, while the wiper pad assembly 106 is adapted to flex to both wipe and absorb the excess ink from printhead 102 after the priming sequence is completed. It is noted that after a certain amount of operation time, ink tray 112 can be slid, pivoted or rotated to move tray 112 from printer 15 and toward an inoperative position outside of printer 15. This facilitates the removal of the foam or felt material and the replacement thereof with new foam or felt material.

In a feature of the invention, when tray 112 is located in the inoperative position partially outside of printer 15, an interlock feature can be provided to prevent a supply of ink to the printhead and also prevent the use of the printhead. When the tray is moved back to the operating position in printer 15, the interlock feature can be released to permit the supply of ink and use of the printhead. The interlock feature can be achieved through a pneumatic or electronic interlock that is adapted to prevent the rotation of the printhead and disable the priming feature. The interlock can further include a switch which is adapted to disable the operating software for the backprinting assembly. As a still further option, the interlock can include a mechanical switch/valve which is adapted to disable the air pressure to the assembly when tray 112 is removed; and/or a magnetic switch that is adapted to disable operating software to prevent the printhead from rotating.

Figure 6:
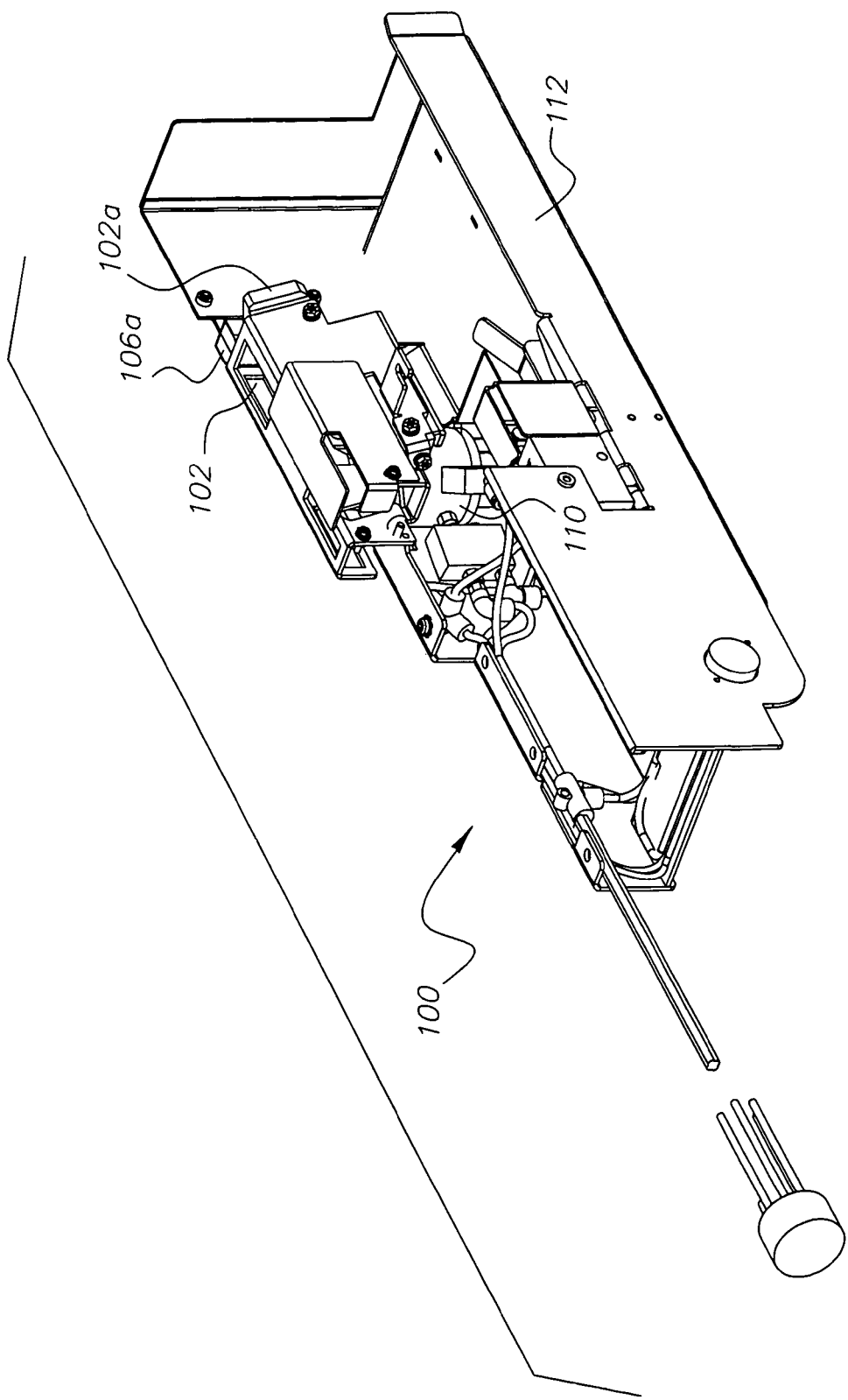
FIG. 6 is a further view of the backprinting assembly of the present invention, wherein the printhead is in a priming position.
Figure 7:
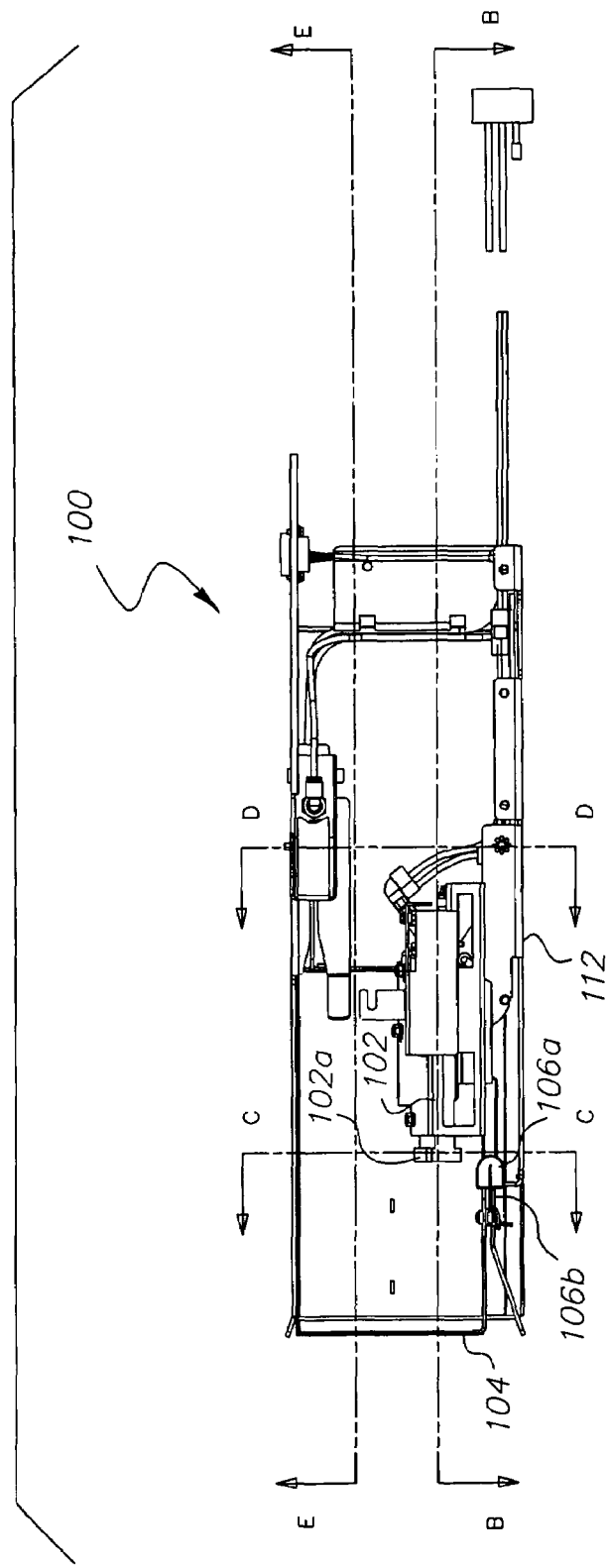
FIG. 7 is a further view of the backprinting assembly of the present invention with the printhead in a priming position.

FIG. 6 is an opposite view of backprinting assembly 100 as shown in FIG. 5 and illustrates ink jet printhead 102 in the priming position to enable the stream of ink during a priming or purging operation to be deposited within enclosure 104 and on ink tray 112. FIG. 7 is a top view of backprinting assembly 100 with ink jet printhead 102 in the priming position to enable a discharge of ink into enclosure 104. FIG. 7 also illustrates a further view of spring clip 106b for wiper pad 106a.

Therefore, the present invention provides for an automatic backprinting assembly which has an auto-priming feature. The assembly of the present invention preferably incorporates a drop on demand ink jet printhead which writes information, such as alphanumeric information on the backside of photographic media during the image processing of the media. With the arrangement of the present invention, the printhead can be moved from a printing position to a priming position at user settable intervals and more specifically, at predetermined time intervals. For example, the present invention can be set up to automatically prime the ink jet printhead at two hour intervals and each time the photographic printer is started up.

The motion (for example, rotary) of the ink jet printhead of the present invention permits the printhead to pivot from the print position to the prime and purge position. The location of the mechanism for rotation or movement of the ink jet printhead is chosen such that the front surface of the printhead translates away from the paper as soon as the rotary motion begins.

The backprinting assembly of the present invention further utilizes an enclosure such as a spittoon that collects waste ink, which is a byproduct of the printing process.

Further, the present invention provides for a disposable composite wiper pad that is attached to the enclosure via a simple spring clip. The location of the wiper pad interferes with the motion of the printhead. Further, the wiper pad flexes while both wiping and absorbing the excess ink from the printhead after the priming sequence is complete.

With the arrangement of the present invention, an automatic priming is possible at predetermined intervals. Further, the rotary head motion, ink enclosure and disposable wiper eliminates labor costs, cleanup costs and provides consistent execution of maintenance. Further, the arrangement enables an automatic priming at set intervals, for example, every two hours, and during an idle time of the photographic processor to ensure consistent backprint image quality. The arrangement of the present invention further permits easy daily cleaning since the printhead can be removed through the removable tray for maintenance, component removal or disassembling.

The invention has been described in detail with particular reference to certain preferred embodiments thereof, but it will be understood that variations and modifications can be effected within the spirit and scope of the invention.

What is claimed is:

1. A printing apparatus comprising:
   a printing section adapted to print images on photographic media; and
   an automatic backprinting assembly adapted to print information on a back side of photographic media;

said automatic backprinting assembly comprising a movable ink jet printhead which is movable between at least a printing position to print on the back side of the photographic media and a priming position where the printhead is pressurized to force a stream of ink through discharge jets of the printhead.

2. A printing apparatus according to claim 1, wherein said automatic backprinting assembly further comprises:
an enclosure having an opening positioned so as to face the discharge jets of said printhead when said printhead is in said priming position, said enclosure being adapted to catch the stream of ink that is forced through the discharge jets of the printhead.

3. A printing apparatus according to claim 2, wherein a wiper pad is positioned at an end of a wall of said enclosure, said wiper pad being adapted to wipe a discharge jet end of said printhead when said printhead moves from said priming position to said printing position so as to remove excess ink from said printhead.

4. A printing apparatus according to claim 2, further comprising a removable ink tray, wherein said printhead and said enclosure are mounted on said ink tray and said ink tray is movable between a non-operative position located partially outside of said printing apparatus and an operative positive located within said printing apparatus.

5. A printing apparatus according to claim 4, wherein an absorbent material is provided on a surface of said ink tray and within said enclosure.

6. A printing apparatus according to claim 3, wherein said wiper pad is formed from a material which has little or no loose fibers.

7. A printing apparatus according to claim 1, wherein said printhead is provided on a rotary moving device which is adapted to rotate the printhead between said printing position and said priming position.

8. A printing apparatus according to claim 1, wherein said printhead is mounted on a pivoting device which is adapted to pivot said printhead between said printing position and said priming position.

9. A printing apparatus according to claim 7, wherein said rotary moving device has a center of rotation which causes the printhead to translate away from the backside of said media as soon as rotary motion of said printhead is initiated.

10. A printing apparatus according to claim 8, wherein said pivoting device is adapted to cause the printhead to translate away from the backside of said media as soon as a pivoting motion of said printhead is initiated.

11. A printing apparatus according to claim 1, wherein said printhead is adapted to provide at least alphanumeric information on the backside of said media.

12. A backprinting assembly adapted to print information on a backside of photographic media, the backprinting assembly comprising:
a movable ink jet printhead which is movable between at least a printing position to print on the backside of the photographic media and a priming position where the printhead is pressurized to force a stream of ink through discharge jets of the printhead.

13. A backprinting assembly according to claim 12, further comprising:
an enclosure having an opening positioned so as to face the discharge jets of said printhead when said printhead is in said priming position, said enclosure being adapted to catch the stream of ink that is forced through the discharge jets of the printhead.

14. A backprinting assembly according to claim 13, wherein a wiper pad is positioned at an end of a wall of said enclosure, said wiper pad being adapted to wipe a discharge jet end of said printhead when said printhead moves from said priming position to said printing position so as to remove excess ink from said printhead.

15. A backprinting assembly according to claim 13, further comprising an ink tray, wherein said printhead and said enclosure are mounted on said ink tray.

16. A backprinting assembly according to claim 15, wherein an absorbent material is provided on a surface of said ink tray and within said enclosure.

17. A backprinting assembly according to claim 14, wherein said wiper pad is formed from a material which has little or no loose fibers.

18. A backprinting assembly according to claim 12, wherein said printhead is provided on a rotary moving device which is adapted to rotate the printhead between said printing position and said priming position.

19. A backprinting assembly according to claim 12, wherein said printhead is mounted on a pivoting device which is adapted to pivot said printhead between said printing position and said priming position.

20. A backprinting assembly according to claim 18, wherein said rotary moving device has a center of rotation which causes the printhead to translate away from the backside of said media as soon as rotary motion of said printhead is initiated.

21. A backprinting assembly according to claim 19, wherein said pivoting moving device is adapted to cause the printhead to translate away from the backside of said media as soon as a pivoting motion of said printhead is initiated.

22. A method of providing information on a backside of photographic media during a photographic printing process, the method comprising the steps of:
inserting photographic media into a photographic printer;
printing an image onto a frontside of the photographic media;
backprinting information onto a backside of the media by positioning a printhead in a printing position and directing ink from said printhead onto the backside of said media;
moving the printhead from said printing position after a predetermined period of time to a priming position where discharge jets of said printhead face an enclosure;
pressurizing said printhead while in said priming position to force a stream of ink through the discharge jets of the printhead and into said enclosure; and
moving said printhead back to said printing position.

23. A method according to claim 22, further comprising:
wiping a discharge jet end of said printhead when said printhead moves from said priming position to said printing position so as to remove excess ink from said printhead.

24. A method according to claim 22, wherein said step of moving said printhead from said printing position to said priming position comprises translating said printhead away from the backside of said media as soon as motion of the printhead is initiated.

* * * * *

UNITED STATES PATENT AND TRADEMARK OFFICE
CERTIFICATE OF CORRECTION

PATENT NO. : 7,478,895 B2 Page 1 of 1
APPLICATION NO. : 10/728628
DATED : January 20, 2009
INVENTOR(S) : Christopher J. Kralles et al.

It is certified that error appears in the above-identified patent and that said Letters Patent is hereby corrected as shown below:

Claim 4, Col. 7, line 24    "positive" should read --position--

Signed and Sealed this

Fourteenth Day of April, 2009

JOHN DOLL
*Acting Director of the United States Patent and Trademark Office*